(12) United States Patent
Sun et al.

(10) Patent No.: US 10,986,325 B2
(45) Date of Patent: Apr. 20, 2021

(54) SCENE FLOW ESTIMATION USING SHARED FEATURES

(71) Applicant: NVIDIA Corporation, Santa Clara, CA (US)

(72) Inventors: Deqing Sun, Cambridge, MA (US); Varun Jampani, Nashua, NH (US); Erik Gundersen Learned-Miller, Amherst, MA (US); Huaizu Jiang, Amherst, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/569,104

(22) Filed: Sep. 12, 2019

(65) Prior Publication Data

US 2020/0084427 A1 Mar. 12, 2020

Related U.S. Application Data

(60) Provisional application No. 62/730,168, filed on Sep. 12, 2018, provisional application No. 62/768,038, filed on Nov. 15, 2018.

(51) Int. Cl.
*H04N 13/122* (2018.01)
*H04N 13/128* (2018.01)
*G06N 3/08* (2006.01)
*H04N 13/00* (2018.01)

(52) U.S. Cl.
CPC .......... *H04N 13/122* (2018.05); *G06N 3/08* (2013.01); *H04N 13/128* (2018.05); *H04N 2013/0081* (2013.01); *H04N 2013/0092* (2013.01)

(58) Field of Classification Search
CPC .......... G06K 9/62; G06K 9/00; H04N 13/122; H04N 13/128; H04N 2013/0081; H04N 2013/0092; G06N 3/08
USPC .............................. 382/156, 154; 348/43, 42
See application file for complete search history.

(56) References Cited

U.S. PATENT DOCUMENTS

| | | | |
|---|---|---|---|
| 7,085,409 B2* | 8/2006 | Sawhney | G06T 15/205 345/419 |
| 8,787,656 B2* | 7/2014 | Park | G06T 7/579 382/154 |
| 9,544,576 B2* | 1/2017 | Tang | G06K 9/6215 |
| 10,057,593 B2* | 8/2018 | Richert | H04N 19/51 |
| 2019/0213481 A1* | 7/2019 | Godard | G06N 3/0454 |

\* cited by examiner

*Primary Examiner* — Trang U Tran
(74) *Attorney, Agent, or Firm* — Leydig, Voit & Mayer, Ltd.

(57) ABSTRACT

Scene flow represents the three-dimensional (3D) structure and movement of objects in a video sequence in three dimensions from frame-to-frame and is used to track objects and estimate speeds for autonomous driving applications. Scene flow is recovered by a neural network system from a video sequence captured from at least two viewpoints (e.g., cameras), such as a left-eye and right-eye of a viewer. An encoder portion of the system extracts features from frames of the video sequence. The features are input to a first decoder to predict optical flow and a second decoder to predict disparity. The optical flow represents pixel movement in (x,y) and the disparity represents pixel movement in z (depth). When combined, the optical flow and disparity represent the scene flow.

20 Claims, 13 Drawing Sheets

SCENE FLOW ESTIMATION USING SHARED FEATURES

CLAIM OF PRIORITY

This application claims the benefit of U.S. Provisional Application No. 62/730,168 titled "Semi-Supervised Scene Flow Prediction with Holistic Scene Understanding," filed Sep. 12, 2018, the entire contents of which is incorporated herein by reference. This application also claims the benefit of U.S. Provisional Application No. 62/768,038 titled "Semi-Supervised Scene Flow Prediction with Holistic Scene Understanding," filed Nov. 15, 2018, the entire contents of which is incorporated herein by reference.

TECHNICAL FIELD

The present disclosure relates to estimating scene flow using a neural network model.

BACKGROUND

Motion of a scene is represented by optical flow data that may be computed from two consecutive frames of a video sequence. Optical flow data is pixel movement between the two consecutive frames of a scene captured at two different time steps. Depth for an image is represented by disparity data that may be computed from a pair of stereo images. In other words, disparity is pixel movement between the two views of the scene captured as the pair of stereo images. Scene flow includes optical flow and disparity data, and represents the three-dimensional (3D) motion of the scene. Scene flow is particularly useful for autonomous driving applications because it is critical to infer distances to cars and other objects and to estimate speeds of the cars and objects.

Conventional systems estimate the optical flow and disparity separately, using dedicated neural networks for each task. A first neural network receives frames of the video sequence and predicts optical flow data (e.g., motion vectors). A second neural network receives stereo image pairs and predicts the disparity data (e.g., depth maps). Training the first and second neural networks is challenging because there is limited training data and existing training data often includes sparse ground-truth annotations. For example, a conventional training dataset includes 200 images where only 19% of the pixels in each image are annotated with ground-truth values. Synthetic data may be generated with rich ground-truth annotations for use to train the first and second neural networks. However, the synthetic data is not photorealistic and lacks details and diversity observed in the real world. There is a need for addressing these issues and/or other issues associated with the prior art.

SUMMARY

Scene flow represents the three-dimensional (3D) structure and movement of objects in a video sequence in three dimensions from frame-to-frame and is used to track objects and estimate speeds for autonomous driving applications. Scene flow is recovered, by a neural network system, from a video sequence captured from at least two viewpoints (e.g., cameras), such as a left-eye and right-eye of a viewer as simulated by a pair of offset cameras. An encoder portion of the system extracts features from frames of the video sequence. The features are input to a first decoder to predict optical flow and a second decoder to predict disparity. The optical flow represents pixel movement in (x,y) and the disparity represents pixel movement in z (depth). In an embodiment, when combined, the optical flow and disparity represent the scene flow. In an embodiment, the scene flow is 3D pixel movement (e.g., 3D motion vectors) that is inferred using the optical flow and the disparity.

A method, computer readable medium, and system are disclosed for estimating scene flow. A first set of features for a first stereo image pair in a sequence of image pairs and a second set of features for a second stereo image pair in the sequence of image pairs are received. A first task-specific decoder neural network computes disparity estimates for the sequence of image pairs based on the first set of features. A second task-specific encoder neural network computes optical flow estimates for the sequence of image pairs based on the first set of features and the second set of features. The disparity estimates and the optical flow estimates are combined to produce a scene flow estimate for the sequence of image pairs.

DETAILED DESCRIPTION

Conventional solutions use separate convolutional neural network (CNN) models for optical flow estimation and disparity estimation. Disparity and optical flow both rely on features extracted from images to establish correspondence. Therefore, instead of using separate CNN models, a feature encoder CNN is shared and the image features generated by the feature encoder are processed by task-specific decoders to generate disparity and optical flow predictions. Sharing the feature encoder not only provides a more compact scene flow system implementation and reduces memory requirements (compared with storing separate parameters for multiple encoders), but it also improves accuracy. Feature representation, as generated by the feature encoder is improved through multi-task learning during end-to-end training. The shared encoder scene flow estimation system may be trained using supervised and self-supervised losses for more holistic scene understanding. In contrast, conventional CNN models are trained separately and do not benefit from multi-task learning. Additionally, the shared encoder scene flow estimation system is able to generate predictions quickly and achieve accurate results, comparing favorably with specialized flow and disparity CNN implementations that consume more memory.

Figure 1A:
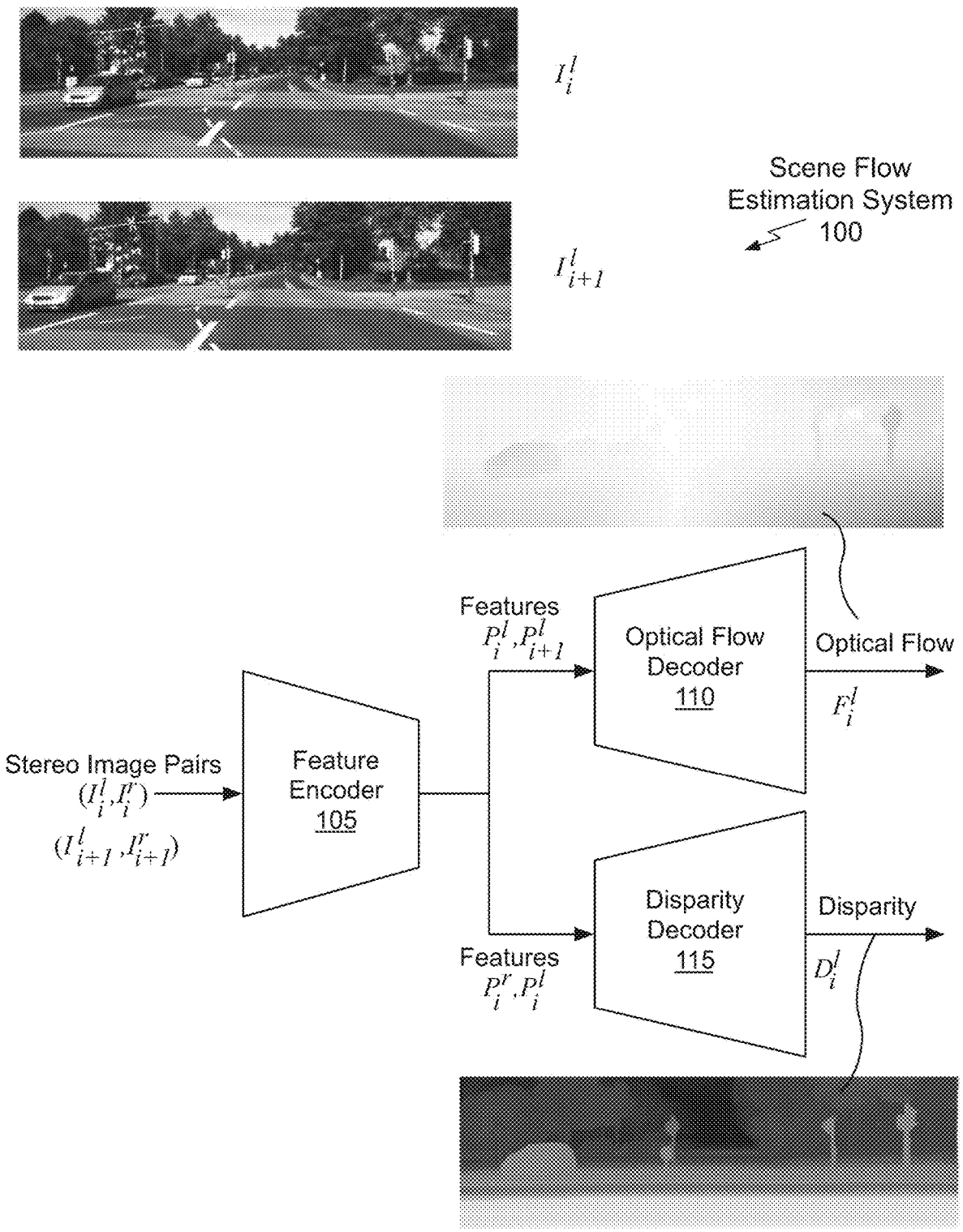
FIG. 1A illustrates a block diagram of a scene flow estimation system, in accordance with an embodiment.

FIG. 1A illustrates a block diagram of a scene flow estimation system 100, in accordance with an embodiment. The scene flow estimation system 100 includes a feature encoder 105, an optical flow decoder 110, and a disparity decoder 115. Although the scene flow estimation system 100 is described in the context of processing units, one or more of the feature encoder 105, the optical flow decoder 110, and the disparity decoder 115 may be implemented by a program, custom circuitry, or by a combination of custom circuitry and a program. For example, operations of the feature encoder 105 may be performed by a GPU (graphics processing unit), CPU (central processing unit), or any processor capable of extracting features.

The feature encoder 105 receives a sequence of images and extracts features based on pixel correspondences between each image and a preceding image. The optical flow that is predicted by the optical flow decoder 110 represents pixel motion. To generate the optical flow, images captured from a single viewpoint (e.g., camera) may be used, such as the left viewpoint images $I_i^l$ and $I_{i+1}^l$, as shown in FIG. 1A, where the superscript l is the left viewpoint and the subscript i is the frame in the image sequence. The features $P_i^l$ and $P_{i+1}^l$ are generated by the feature encoder 105 and input to the optical flow decoder 110. Alternatively, the optical flow is generated from the right viewpoint images $I_i^r$ and $I_{i+1}^r$, where the superscript r is the right viewpoint.

To produce disparity data, the feature encoder 105 receives a sequence of images from different viewpoints. The disparity that is predicted by the disparity decoder 115 represents pixel movement between stereo images captured from the different viewpoints at a single time step. To generate the disparity, images from different viewpoints are used, such as the right and left viewpoint images $I_i^r$ and $I_i^l$, as shown in FIG. 1A. The images may be an image pair from the same frame or different viewpoint images from sequential frames (e.g., i and i+1). The features $P_i^r$ and $P_i^l$ are generated by the feature encoder 105 and input to the disparity decoder 115.

In an embodiment, two or more of the feature encoder 105 are included in the scene flow estimation system 100 to extract features for different viewpoints and/or different frames in parallel. Importantly, each feature encoder 105 uses the same set of weights to generate features regardless of the task. The scene flow is a combination of the optical flow estimates using at least two images in the sequence at different time steps and disparity estimates between two images captured from different viewpoints for the same time step. The optical flow represents pixel movement in (x,y) over time and the disparity represents pixel position in z (depth) and, over time, movement in z, to produce the 3D motion for each image in a sequence.

In an embodiment, at least one additional task-specific decoder receives the extracted features from the feature encoder 105 to perform semantic segmentation, occlusion, and/or camera pose estimation. The feature encoder 105 uses the same weights to process a set of at least 3 images ($\{I_i^r, I_j^l, I_{i+1}^l\}$ or $\{I_i^r, I_i^l, I_{i+1}^r\}$) for scene flow and 4 images ($I_i^r, I_{i+1}^l, I_{i+1}^l$) when one or more of the semantic segmentation, occlusion, and camera pose tasks are also performed by the scene flow estimation system 100.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
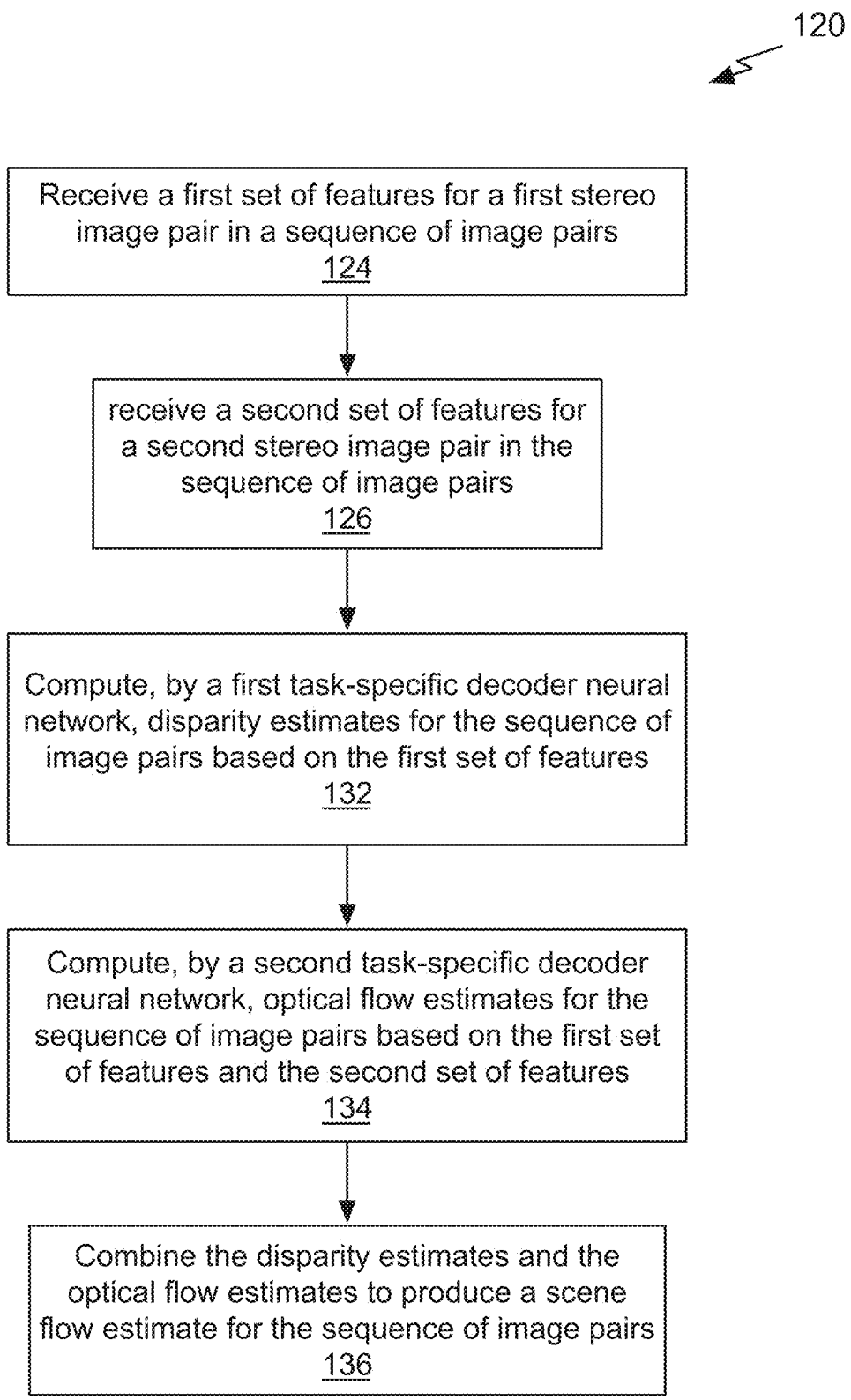
FIG. 1B illustrates a flowchart of a method for estimating scene flow, in accordance with an embodiment.

FIG. 1B illustrates a flowchart of a method 120 for estimating scene flow, in accordance with an embodiment. Although method 120 is described in the context of a scene flow estimation system 100, persons of ordinary skill in the art will understand that any system that performs method 120 is within the scope and spirit of embodiments of the present disclosure.

At step 124, a first task-specific decoder neural network and a second task-specific decoder neural network receive a first set of features for a first stereo image pair in a sequence of image pairs. In an embodiment, the first task-specific decoder neural network is the disparity decoder 115. At step 126, the second task-specific decoder neural network receives a second set of features for a second stereo image pair in the sequence of image pairs. In an embodiment, the first and second sets of features are generated by the feature encoder 105. In an embodiment, a first feature encoder 105 generates features for a first viewpoint and a second feature encoder 105 generates features for a second viewpoint. In an embodiment, the first set of features includes $P_i^r$ and $P_i^l$. In an embodiment, the second set of features includes $P_{i+1}^r$ $P_{i+1}^l$.

In an embodiment, the first set of features includes a feature pyramid of a first image of a scene captured from a first viewpoint and a feature pyramid of a second image of the scene captured from a second viewpoint. In an embodiment, the first image of the scene and the second image of the scene are captured at the same time or substantially the same time. In an embodiment, the second set of features includes a feature pyramid of a third image that is after the first image in the sequence and is captured from the first viewpoint. In an embodiment, the second set of features includes a feature pyramid of a third image that is after the first image in the sequence and is captured from the first viewpoint and a feature pyramid of a fourth image that is after the second image in the sequence and is captured from the second viewpoint.

At step 132, the first task-specific decoder neural network computes disparity estimates for the sequence of image pairs based on the first set of features. In an embodiment, the disparity estimates (e.g., $D_i^r$ and $D_i^l$) are depth values computed for a stereo image pair (e.g., $I_i^r$ and $I_i^l$). In an embodiment, the disparity estimates are depth-based motion vectors computed using the depth values for two different time steps. In an embodiment, the first task-specific decoder neural network may compute the disparity estimates using any combination of features for one image from the first viewpoint and one image from the second viewpoint. In an embodiment, at step 126, the first task-specific decoder neural network receives the second set of features and at step 132, the first task-specific decoder neural network computes disparity estimates for the sequence of image pairs based on the first set of features and the second set of features.

At step 134, the second task-specific decoder neural network computes optical flow estimates for the sequence of image pairs based on the first set of features and the second set of features. In an embodiment, the second task-specific decoder neural network is the optical flow decoder 110. In an embodiment, the first task-specific decoder neural network and the second task-specific decoder neural network use the same parameters (e.g., weights) to process the first set of features and the second set of features. The second task-specific decoder neural network may compute the optical flow estimates using any combination of features for one image at a first time step in the sequence and one image at a second time step in the sequence. At step 136, the disparity estimates and the optical flow estimates are combined to produce a scene flow estimate for the sequence of image pairs.

In an embodiment, the optical flow decoder 110 is a compact, but effective CNN model for optical flow estimation that exploits the principles of pyramid structures, warping, and correlation. Features extracted by the feature encoder 105 from a first image and features extracted by the feature encoder 105 from a second image are both stored as pyramidal structures of image features. The optical flow decoder 110 uses an upsampled optical flow computed for the previous (l−1) level of the pyramid structures to warp the features of the second image for the lth level. The optical flow decoder 110 computes a partial cost volume based on the correlation between features of the first image and the warped features of the second image. The correlation output provides strong cues to estimate the flow increment and is processed by convolution layers to refine the current optical flow.

The feature encoder 105 generates a first pyramidal set of features for a first image and a second pyramidal set of features for a second image, where the second image is immediately after the first image in a video sequence. A pyramidal set of features (e.g., feature pyramid structure) is generated to have L levels, where each level l includes feature representations associated with a different resolution (in pixels) of the image. In an embodiment, the bottom (l=1) level of the pyramidal set of features is the first image. A higher (l=2) level of the pyramidal set of features is generated by convolving the image data (i.e., color and/or depth values for each pixel in the first image) with a filter. In an embodiment, the filter is 3×3 pixels and a stride of 2 is used to generate one or more features for each application of the filter. In an embodiment, each subsequent (l+1) level in the pyramidal set of features is generated by downsampling the features from the lower (l) level in the pyramidal set of features. In an embodiment L=5. In an embodiment, reducing the number of pyramid levels from 6 to 5 reduces the number of parameters to be learned by nearly 50%

In contrast with a conventional image pyramid, where each level is a two-dimensional array of color values generated by downsampling color values of a higher resolution image, each level of the feature pyramid has high-dimensional features at each 2D location instead of only color values. The third dimension is a number of channels, where each channel corresponds to a different feature for the same pixel location. In an embodiment, the pyramidal set of features is generated by a CNN having multiple layers and each layer of the neural network generates features at a single pyramid level. In an embodiment, the number of feature channels in a pyramidal set of features having 7 levels is 16 at the bottom layer (l=1), increasing to 32, 64, 96, 128, and 196 at the top (l=7) level. Features at higher levels of the pyramidal set of features tend to capture global structures within the image, whereas features at lower levels describe fine details of the image.

A drawback of conventional image pyramid having fixed values at each level is that the raw images used to generate the conventional image pyramid do not provide good features to establish correspondence between different images in a video sequence, particularly in the presence of shadows and lighting changes. The conventional image pyramid is simply downsampled versions of the input image. Therefore, the conventional image pyramid is replaced with a feature pyramid (i.e., pyramidal set of features) and, when the feature pyramid is generated using a neural network, such as the feature encoder 105, the parameters used to generate the features may be learned through training. Each level of the feature pyramid includes feature maps that better represent the image correspondences.

In an embodiment, the feature encoder 105 generates the first and second feature pyramids starting with the first and second images at the bottom level and generating feature maps at each higher level until the top level is reached. The optical flow estimation technique performed by the optical flow decoder 110 is iterative, starting at a coarse level of detail (top level of the feature pyramid) and finishing at a fine level of detail (bottom level of the feature pyramid). Conventional techniques first compute two (Gaussian) image pyramids for the first and the second images. In contrast, the feature encoder 105 is a neural network configured to construct feature pyramids, learning the filter weights and/or biases that are used to compute the features from a training dataset. In an embodiment, features are extracted from the first image and the second image at the bottom level by a convolutional layer and then the extracted features are downsampled by another convolutional layer to generate the features for the subsequent level. Thereafter, each level is downsampled by a convolutional layer to generate the features for the level above until the top level is reached.

Figure 1C:
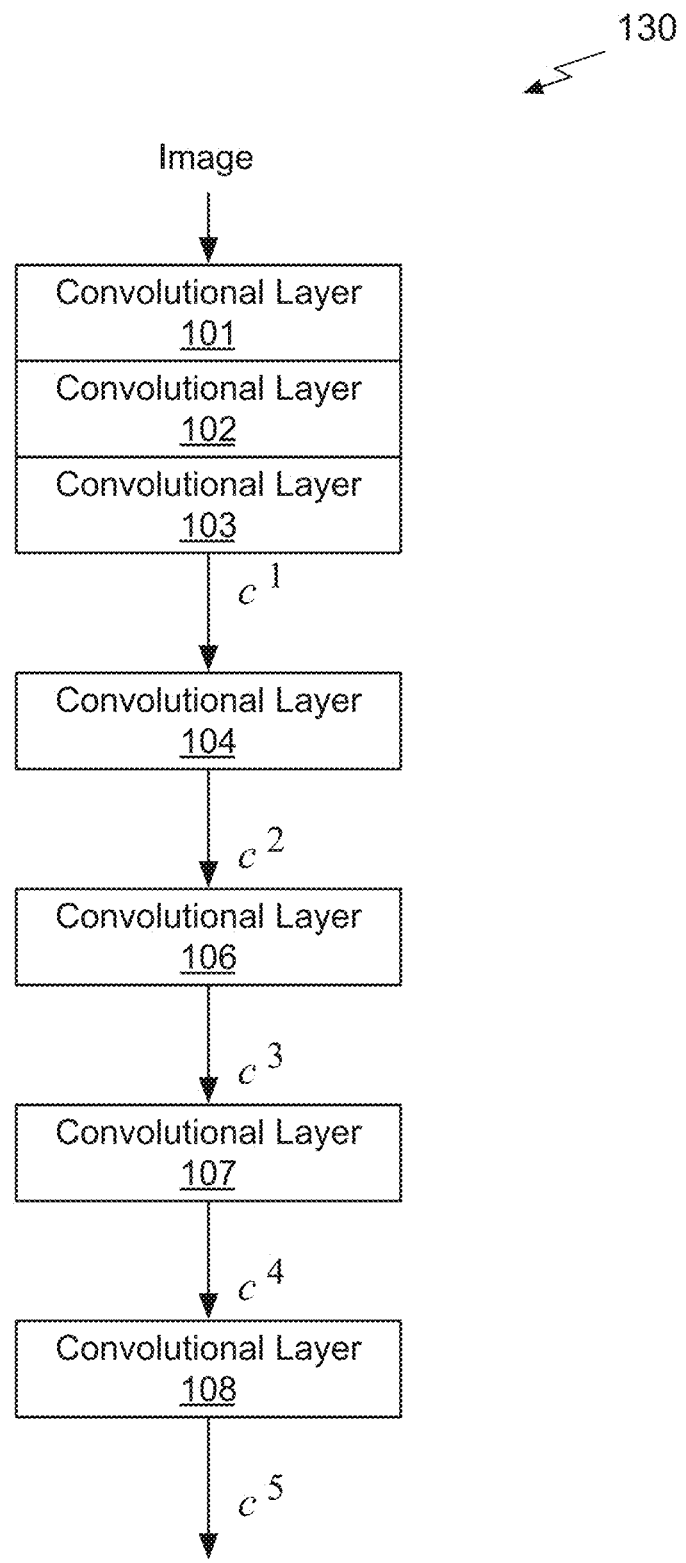
FIG. 1C illustrates a block diagram of the feature encoder, in accordance with an embodiment.

FIG. 1C illustrates a block diagram 130 of the feature encoder 105, in accordance with an embodiment. In an embodiment, the feature encoder 105 is a pyramidal image feature structure generator implemented as the block diagram 130. Although the block diagram 130 is described in the context of processing units, the block diagram 130 may also be implemented by a program, custom circuitry, or by a combination of custom circuitry and a program.

An image is input to a convolutional layer 101 that downsamples the image. In an embodiment, a convolutional filter with a layer setting of 3×3, 32 is used (e.g., 3×3 kernel size generating 32 channels) with a stride of 2 to perform a 2× downsampling on a 512×512 pixel image. The downsampled feature map is processed by a convolutional layer 102. In an embodiment, the convolutional layers 102 and 103 each perform a convolution operation with a layer setting of 3×3, 32 on the downsampled image to extract the features $c^1$. In an embodiment, the image includes 3 channels (e.g., red, green, blue color channels) and the features $c^1$ includes 32 channels that are each 256×256 pixels. In an embodiment, the output size of $c^1$ is $$\frac{H}{2} \times \frac{W}{2} \times 32,$$

where H is the height of the input image and W is the width of the input image.

In an embodiment, each group of convolutional layers (e.g, convolutional layers 101, 102, and 103) are replaced with a residual block. A residual network (ResNet) structure may reduce the number of parameters and improve estimation accuracy, particularly for disparity prediction and/or optical flow. In an embodiment, the feature encoder 105 is modified to include batch normalization layers and/or activation functions before or after each convolutional layer.

The features $c^1$ is input to a convolutional layer 104 that extracts the features $c^2$. In an embodiment, the convolutional layer 104 performs a convolution operation with a layer setting of $$\begin{bmatrix} 3\times 3, 32 \\ 3\times 3, 32 \end{bmatrix} \times 3$$

to perform a 2× downsampling on the features $c^1$ and extract the features $c^2$. The layer setting $$\begin{bmatrix} a\times a, b \\ a\times a, b \end{bmatrix} \times c$$

specifies a filter size a×a, b is the number of filters, and c indicates the number of instances of the block (i.e., the block is repeated c times in sequence). In an embodiment, the features $c^2$ includes 32 channels that are each 128×128 pixels. In an embodiment, the output size of $c^2$ is $$\frac{H}{4} \times \frac{W}{4} \times 32.$$

The features $c^2$ is input to a convolutional layer 106 that extracts the features $c^3$. In an embodiment, the convolutional layer 106 performs a convolution operation with a layer setting of $$\begin{bmatrix} 3\times 3, 64 \\ 3\times 3, 64 \end{bmatrix} \times 16$$

to perform a 2× downsampling on the features $c^2$ and extract the features $c^3$.

In an embodiment, the features $c^3$ includes 64 channels that are each 64×64 pixels. In an embodiment, the output size of $c^3$ is $$\frac{H}{8} \times \frac{W}{8} \times 64.$$

The features $c^3$ is input to a convolutional layer 107 that extracts the features $c^4$. In an embodiment, the convolutional layer 107 performs a convolution operation with a layer setting $$\begin{bmatrix} 3\times 3, 128 \\ 3\times 3, 128 \end{bmatrix} \times 3$$

to perform a 2× downsampling on the features $c^3$ and extract the features $c^4$.

In an embodiment, the features $c^4$ includes 96 channels that are each 32×32 pixels. In an embodiment, the output size of $c^4$ is $$\frac{H}{16} \times \frac{W}{16} \times 128.$$

The features $c^4$ is input to a convolutional layer 108 that extracts the features $c^5$. In an embodiment, the convolutional layer 108 performs a convolution operation with a layer setting of $$\begin{bmatrix} 3\times 3, 128 \\ 3\times 3, 128 \end{bmatrix} \times 3$$

to perform a 2× downsampling on the features $c^4$ and extract the features $c^5$.

In an embodiment, the features $c^5$ includes 128 channels that are each 16×16 pixels. In an embodiment, the output size of $c^5$ is $$\frac{H}{32} \times \frac{W}{32} \times 128.$$

Figure 1D:
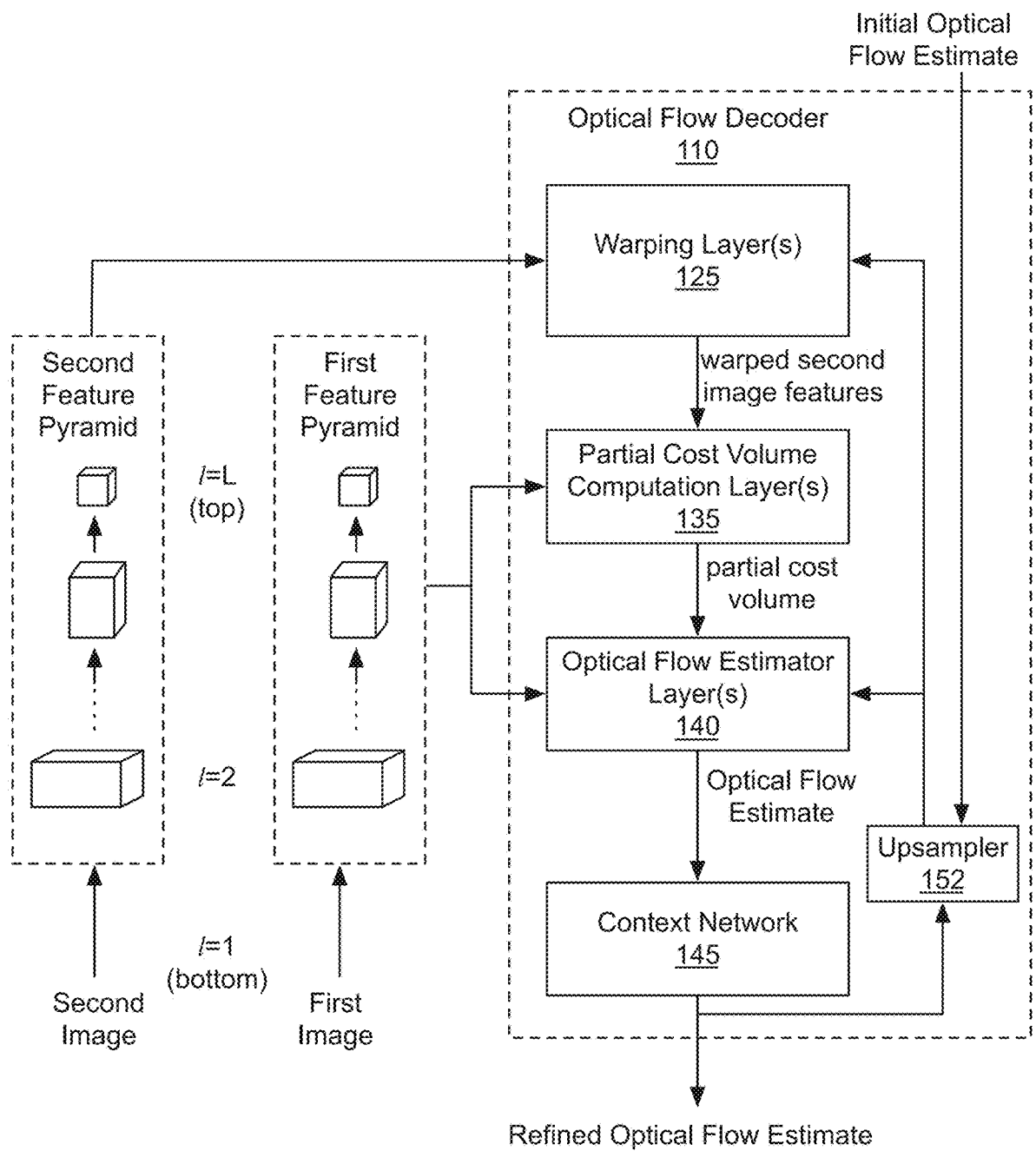
FIG. 1D illustrates a block diagram of the optical flow decoder, in accordance with an embodiment.

FIG. 1D illustrates a block diagram of the optical flow decoder 110, in accordance with an embodiment. The optical flow decoder 110 receives features extracted by the feature encoder 105 and comprises multiple layers including one or more warping layer(s) 125, one or more partial cost volume computation layer(s) 135, one or more optical flow estimator layer(s) 140, an upsampler 152, and a context network 145. In an embodiment, the warping layer(s) 125 comprises a single layer, the partial cost volume computation layer(s) 135 comprises a single layer, and the optical flow estimator layer(s) 140 comprises a CNN with multiple layers. In an embodiment, the context network 145 is omitted and the optical flow estimate generated by the optical flow decoder 110 is used as the refined optical flow estimate. The context network 145 is configured to post-process an optical flow estimate and may perform median filtering, weighted median filtering, and/or bilateral filtering to generate the refined optical flow estimate.

In an embodiment, for processing by the optical flow decoder 110, the top level (l=L), the initial optical flow estimate is initialized to 0 and provided to the warping layer(s) 125 and optical flow estimator layer(s) 140 by the upsampler 152. Beginning at the top level of the feature pyramids, the features of the second image at the current level are warped using the initial optical flow estimate. For subsequent levels of the feature pyramids, the features of the second image at the current level are warped using the refined optical flow estimate, $w^l$ computed by the optical flow decoder 110 for the next higher (coarser) pyramid level that is upsampled by the upsampler 152.

In contrast, conventional techniques using image pyramids use spatial and temporal differences of the two small images at the top levels of the image pyramids to compute the initial optical flow. At the next pyramid level, the optical flow is upsampled from the higher level, and used to warp the second image toward the first image. Spatial and temporal differences are computed for the first image and the warped second image and the differences and the upsampled optical flow are used to compute the new optical flow estimate at the current level. However, the temporal difference computed by the conventional optical flow techniques, only allow small, often subpixel, changes around the upsampled flow.

For the first iteration to estimate the optical flow, the top (l=L) level of the feature pyramid for the second image is warped toward the top level of the feature pyramid for the first image using an initial optical flow estimate. Importantly, the feature pyramid structures and warping enable a reduction in the search range (in pixels) used to compute the partial cost volume. The partial cost volume is computed for the top level using the top level of the first feature pyramid and the warped top level of the second feature pyramid. The optical flow estimate is then computed using the top level of the first feature pyramid, the cost volume of the top level, and the initial optical flow estimate. The computed optical flow estimate is then upsampled and the process is repeated (starting at the warping) for the (l=l−1) level of the feature pyramids. The process continues until the bottom level of the feature pyramids is used to produce a final optical flow estimate.

Disparity is a special case of optical flow computation, with correspondences lying on a line corresponding with the direction of offset between the cameras. Consequently, for the disparity decoder 115, the partial cost volume computation layer(s) 135 is adapted to compute a one-dimensional cost volume instead of the 2D cost volume that is computed by the optical flow decoder 110. Specifically, to estimate optical flow, a feature at p=(x, y) in the first feature map is compared to features at q∈[x−k, x+k]×[y−k, y+k] in the warped second feature map. For disparity, correspondences are identified by comparing p in the left feature map to q∈[x−k, x+k]×y in the warped right feature map. In an embodiment, k=4 for both optical flow and disparity estimations. In an embodiment, across the feature pyramids, the disparity decoder 115 adopts the same warping and refinement process as the optical flow decoder 110.

As a result of the warping operation for disparity and optical flow estimation, features of an object in the second image are closer to features representing the same object in the first image, so it is not necessary to search the entire warped second image features to identify the object. Instead, a limited range of pixels surrounding a first location of the features of the object in the first image may be searched. In an embodiment, the limited range of pixels is a 3×3 pixel region centered at the first location. Importantly, the limited range is less than the full resolution, in pixels, of the first image, where the full resolution is one of the dimensions (e.g., height or width) of the first image. Note that the dimensions of the first image and the warped second image for each level of the feature pyramids are equal. In the context of the following description, the limited range of pixels is applied to a level of the second pyramidal set of features that is warped. The limited range of pixels is centered at a first location corresponding to the first location in the level of the first pyramidal set of features.

The warping layer(s) 125 warps the features of the second image, $c^{l-1}$ toward the first image using the upsampled optical flow from the lth level.

$$c_w^{l-1}(x) = c_c^{l-1}(x + \uparrow w^l(x)), \quad (1)$$

where $\uparrow w^l$ denotes the upsampled and scaled optical flow from the lth level and is zero at the top level. The bilinear interpolation method may be used to implement the warping operation and compute the gradients for the features and optical flow estimates for backpropagation during training of the feature encoder 105. For non-translational motion, warping can compensate some geometric distortions and place image patches at the correct scale.

At the lth pyramid level, the partial cost volume computation layer(s) 135 computes the partial cost volume by computing the correlation using features of the first image, $c_1^l$ toward and warped features of the second image, $c_w^l$:

$$cv^l(x_1, x_2) = \frac{1}{N}(c_1^l(x_1))^T c_w^l(x_2), \quad (2)$$

Where T is the transpose operator and N is the length of the column vector $c_1^l(x_1)$. For a seven level (L=7) feature pyramid, a partial cost volume is computed with a limited range of d pixels, i.e., $|x_1−x_2|_\infty \le d$. Note that a one-pixel motion at the top level corresponds to 64 ($2^6$) pixels at the full resolution first and second images. Thus, d can be set to a small value.

During end-to-end training of the feature encoder 105, the optical flow decoder 110, and the disparity decoder 115, the neural network parameters (e.g., weights) for the feature encoder 105 are learned. Compared with conventional techniques that use energy minimization in place of the partial cost volume computation layer(s) 135 and optical flow estimator layer(s) 140, the warping, partial cost volume, and layers of the optical flow estimator layer(s) 140 within the optical flow decoder 110 are computationally light. Further, the warping layer(s) 125 and partial cost volume computation layer(s) 135 have no learnable parameters, significantly reducing the size of the optical flow decoder 110. In an embodiment, the learned parameters for the optical flow decoder 110 are shared with the disparity decoder 115 (further reducing memory requirements).

The partial cost volume computation layer(s) 135 receive the warped second image features and the first feature pyramid and computes a partial cost volume indicating the correlation between features of the first image and features of the warped second image. In an embodiment, the partial cost volume calculation is a correlation or inner-product operation between corresponding features (e.g., similar values at the same location are highly correlated). In contrast, conventional techniques compute the temporal difference between the first image and the warped second image. The correlation output provides strong cues to estimate the flow increment and is processed by convolution layers to refine the current optical flow. More specifically, a peak in the cost volume indicates an area of correlated motion. Computation of the partial cost volume indicates changes that are as large as the range of correlation around the unsampled optical flow. In an embodiment, the partial cost volume is computed across a limited range of pixels that is less than a full resolution of the first image, in pixels, at the level.

Conventional optical flow estimation techniques compute a full cost volume, building the full cost volume at a single scale, which is both computationally expensive and memory intensive. By contrast, constructing the partial cost volume at multiple pyramid levels results in optical flow estimation models that are computationally accurate and efficient.

To obtain the optical flow estimate wt at the lth pyramid level, the features of the first image, the partial cost volume, and the upsampled optical flow estimate $w^{l-1}$ provided by the upsampler 152 are input the optical flow estimator layer(s) 140. In an embodiment, the parameters used by the optical flow estimator layer(s) 140 for processing different levels of the feature pyramids are not shared, so separate parameters are used for each level. The optical flow is estimated for each level by optical flow decoder 110 until the bottom level is reached. In an embodiment, the optical flow estimator layer(s) 140 outputs quarter resolution optical flow and bilinear interpolation is used to obtain the full-resolution optical flow estimate. In an embodiment, the context network 145 is omitted and the upsampler 152 receives the optical flow estimate directly from the optical flow estimator layer(s) 140.

As context is crucial for optical flow estimation, in an embodiment, the context network 145 is employed at the desired pyramid level (i.e., the bottom level), to effectively enlarge the receptive field size of each output unit. In an embodiment, the context network 145 is a feed-forward CNN, that receives the estimated optical flow and features of the second to last layer ($f^2$) from the optical flow estimator layer(s) 140, and outputs the refined optical flow estimate.

In an embodiment, the design of the context network 145 is based on dilated convolutions and includes seven convolutional layers. The spatial kernel for each convolutional layer is 3×3 and the layers have different dilation constants. A convolutional layer with a dilation constant k means that an input unit to a filter in the layer are k-unit apart from the other input units to the filter in the layer, both in vertical and horizontal directions. Convolutional layers with large dilation constants enlarge the receptive field of each output unit without incurring a large computational burden. In an embodiment, from bottom to top, the dilation constants are 1, 2, 4, 8, 16, 1, and 1.

In an embodiment, for predicting disparity, the optical flow decoder 110 may be modified to produce the disparity decoder 115. Specifically, the context network 145 and upsampler 152 may be replaced with an hourglass refinement model. When used for disparity estimation refinement, the hourglass model receives an input that is a concatenation of upsampled disparity (by a factor of 2), the feature map of the first image (128-dimensional), and the warped feature map of the second image (128-dimensional). The output is a residual disparity estimation that is added to the twice upsampled disparity estimate produced by disparity estimator layer(s) corresponding to the optical flow estimator layer(s) 140. In an embodiment, the hourglass refinement model is implemented based on the definition shown in TABLE 1.

TABLE 1

Definition of a disparity Hourglass refinement model

| layer name | output size | layer setting |
|---|---|---|
| input | $\frac{H}{2} \times \frac{W}{2} \times 257$ | — |
| conv1 | $\frac{H}{4} \times \frac{W}{4} \times 514$ | 3 × 3,514 |
| conv2 | $\frac{H}{8} \times \frac{W}{8} \times 514$ | 3 × 3,514 |
| conv3 | $\frac{H}{8} \times \frac{W}{8} \times 514$ | 3 × 3,514 |
| conv4 | $\frac{H}{4} \times \frac{W}{4} \times 514$ | bilinear interpolation 3 × 3,514 |
| conv5 | $\frac{H}{2} \times \frac{W}{2} \times 257$ | bilinear interpolation 3 × 3,257 |
| output | $\frac{H}{2} \times \frac{W}{2} \times 1$ | 3 × 3, 1 |

The spatial resolution of the disparity estimate is ¼ of the resolution corresponding to the input image. Rather than simply upsampling the disparity estimate, which may produce blurred disparity boundaries, the hourglass refinement model is used to predict the residual disparity estimate. In an embodiment, the features extracted from the second image are warped and concatenated with the features extracted from the first image (as guidance) and input to an hourglass function to predict the residual disparity that is added to the upsampled predicted disparity.

Figure 1E:
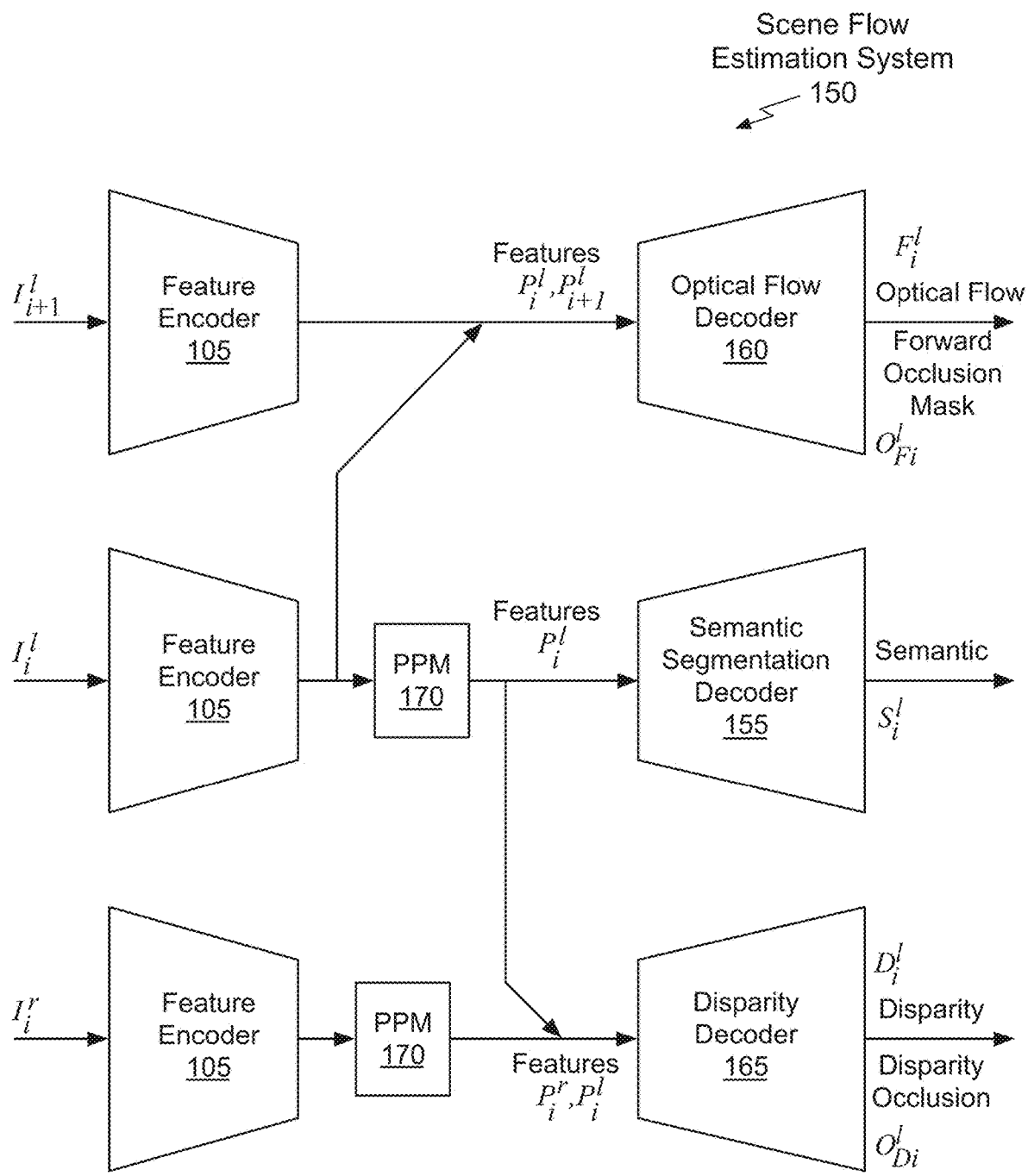
FIG. 1E illustrates a block diagram of another scene flow estimation system, in accordance with an embodiment.

FIG. 1E illustrates a block diagram of another scene flow estimation system 150, in accordance with an embodiment. Compared with the scene flow estimation system 100, the scene flow estimation system 150 includes two additional features encoders 105, a semantic segmentation decoder 155, and two pyramid pooling modules (PPMs) 170. The optical flow decoder 110 and disparity decoder 115 are replaced with an optical flow decoder 160 and a disparity decoder 165, respectively. Each feature encoder 105 uses the same parameters to extract features from different images. The extracted features that are input to the semantic segmentation decoder 155 and the disparity decoder 165 are also processed by a respective PPM 170. The PPM 170 aggregates the learned features of input images across multiple levels. Like the hourglass refinement technique, the PPM improves disparity estimation. While hourglass refinement and PPM do not necessarily improve optical flow estimation, the modular encoder design can be flexibly configured for different tasks, so that the hourglass refinement and/or PPM may be beneficially applied to tasks. The PPM 170 may be configured according to the definition shown in TABLE 2.

TABLE 2

Definition of a PPM

| layer name | output size | layer setting |
|---|---|---|
| branch1 | $\frac{H}{32} \times \frac{W}{32} \times 128$ | 1 × 1 adaptive avg. pool 1 × 1,128 bilinear interpolation |
| branch2 | $\frac{H}{32} \times \frac{W}{32} \times 128$ | 2 × 2 adaptive avg. pool 1 × 1,128 bilinear interpolation |
| branch3 | $\frac{H}{32} \times \frac{W}{32} \times 128$ | 3 × 3 adaptive avg. pool 1 × 1,128 bilinear interpolation |
| branch4 | $\frac{H}{32} \times \frac{W}{32} \times 128$ | 6 × 6 adaptive avg. pool 1 × 1,128 bilinear interpolation |
| fusion | $\frac{H}{32} \times \frac{W}{32} \times 128$ | concat of conv5, branch1 branch2, branch3, and branch 4 3 × 3,128 |

In an embodiment, branch1, branch2, branch3, and branch4 are all parallel branches on top of the convolutional layer 108 in the feature encoder 105, where conv5 is output by the feature encoder 105. The optical flow decoder 160 performs the operations of the optical flow decoder 110, as well as occlusion predictions for binary classification. As shown in FIG. 1E, the optical flow decoder 160 generates optical flow estimates and corresponding forward occlusion masks and the disparity decoder 165 generates disparity estimates and corresponding disparity occlusion estimates. In an embodiment, the forward occlusion mask for an image includes a single bit for each pixel indicating whether the pixel is covered by an object that was visible in the previous frame. In an embodiment, the disparity occlusion estimates for an image corresponding to a first viewpoint includes a single bit for each pixel indicating whether the pixel is covered by an object that is visible in a paired image corresponding to a second viewpoint.

The semantic segmentation decoder 155 generates semantic estimates, associating each pixel in the input image with a class label (e.g., car, pedestrian, etc.). In an embodiment, the optical flow decoder 160, disparity decoder 165, and semantic segmentation decoder 155 are only used during training, where, during inferencing, the optical flow decoder 160 and disparity decoder 165 are replaced with the optical flow decoder 110 and the disparity decoder 115, respectively. For optical flow, disparity, and/or scene flow estimation, task-specific decoders can be added as needed during training, without impacting the inferencing speed of the scene flow estimation system 100 or 150. Estimating results for other tasks for holistic scene understanding, such as including occlusion detection for flow, as well as, optionally, stereo or semantic segmentation, induces better feature presentations in the shared feature encoder 105 and provides extra supervision signals for training the scene flow estimation systems 100 and/or 150, thereby compensating for partially labeled data.

When corresponding ground-truth annotations are available for training the scene flow estimation system 100 and/or 150, the supervised loss is defined as:

$$\mathcal{L}_{sp} = (\mathcal{L}_F + \mathcal{L}_{O_F}) + a_D(\mathcal{L}_D + \mathcal{L}_{O_D}) + a_S \mathcal{L}_S, \quad \text{(Eq. 1)}$$

where $\mathcal{L}_F$ and $\mathcal{L}_{O_F}$ are loss terms for optical flow and corresponding occlusion estimations in the optical flow decoder pyramid. $\mathcal{L}_D$ and $\mathcal{L}_{O_D}$ are the loss terms for disparity and occlusion estimations. $\mathcal{L}_S$ is defined as a summation of pixel-wise cross entropy loss over all segmentation categories. $\mathcal{L}_F$ is defined across multiple pyramid levels as:

$$\mathcal{L}_F = \sum_{i=1}^{L} \omega_i \sum_p \rho(F_i(p), \hat{F}_i(p))$$

where $\omega_i$, denotes optical flow and disparity weights at pyramid level i, L is the number of pyramid levels, and $\rho(\cdot,\cdot)$ is a loss function measuring the similarity between optical flow ground-truth $\hat{F}_i(p)$ and estimation $F_i(p)$ at pixel p. Disparity and occlusion loss functions, $\mathcal{L}_D$, $\mathcal{L}_{O_F}$ and $\mathcal{L}_{O_D}$ are defined in a similar way.

In an embodiment, the $L_2$ loss and the Smooth $L_1$ loss functions are used for optical flow and disparity estimations. The Smooth $L_1$ loss function may be computed in multiple pyramid levels as $\mathcal{L}_F$ and $\mathcal{L}_D$. In an embodiment, binary cross entropy loss is used for the occlusions when ground-truth annotations are available. Ground-truth annotations may be available for either the left or right images only.

Adding extra supervision for occlusion estimation is helpful for the optical flow decoder 160 and disparity decoder 165 to extrapolate optical flow and disparity estimations to regions where ground-truth annotations are missing, yielding visually appealing results. In an embodiment, a model that is pre-trained on synthetic data is used to provide the occlusion estimations. In an embodiment, the occlusion estimation generated by the optical flow decoder 160 and the disparity decoder 165 during training do not deviate much from what was learned in the pre-training stage. Therefore, during training, the estimations of a pre-trained neural network model may be used as pseudo ground-truth. In an embodiment, supervised loss is computed for annotated data and self-supervised loss is computed for both labeled and unlabeled data.

Figure 2A:
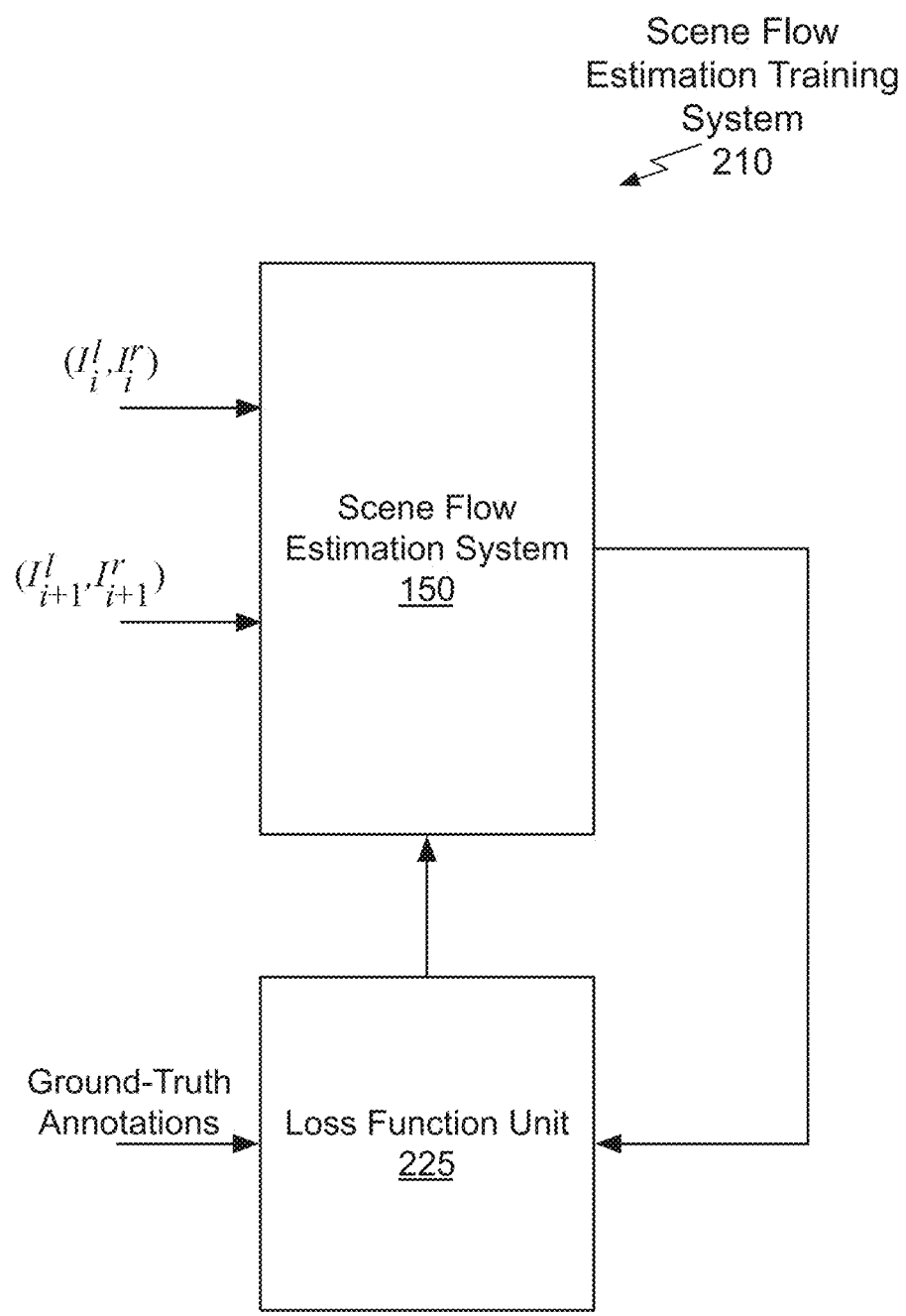
FIG. 2A illustrates a block diagram of a scene flow estimation training system, in accordance with an embodiment.

FIG. 2A illustrates a block diagram of a scene flow estimation training system 210, in accordance with an embodiment. The scene flow estimation training system 210 includes the scene flow estimation system 150 and a loss function unit 225. During supervised training, the loss function unit 225 receives the ground-truth annotations for sequences of stereo image pairs input to the scene flow estimation system 150. The loss function unit 225 receives the optical flow, disparity, and occlusion estimations generated by the scene flow estimation system 150 and computes the loss terms $\mathcal{L}_F$, $\mathcal{L}_{O_F}$, $\mathcal{L}_D$, and $\mathcal{L}_{O_D}$ for disparity and occlusion estimations. In an embodiment, the loss function unit 225 computes the supervised loss according to equation (1).

The loss function unit 225 outputs updated parameters to the scene flow estimation system 150. The parameters are updated to reduce differences between the ground-truth annotations and the optical flow, disparity, and occlusion estimations. In an embodiment, backward propagation through the layers of the scene flow estimation system 150 is used to update the parameters.

A self-supervised loss is also defined to further constrain the training of the scene flow estimation system 100 or 150. Self-supervised loss is computed using interactions between different outputs of the scene flow estimation system 100 or 150 and ground-truth annotations are not needed. Optical flow and disparity are defined as correspondence between two input images. Therefore, two corresponding pixels defined by either optical flow or disparity can be compared and the result used as supervision for the training.

The most straightforward metric is to compare values between two corresponding pixels, known as photometric consistency. For example, two corresponding pixels in two images (e.g., $I_1^l$, $I_1^r$) defined by the disparity prediction should have similar pixel values and segmentation results. Similarly, two corresponding pixels in two images (e.g., $I_1^l$, $I_2^l$) defined by the optical flow prediction should have similar pixel values and segmentation results.

The loss function unit 225 compares values for corresponding pixels in the optical flow estimates for a sequence of image pairs and the corresponding pixels in the semantic segmentation estimates to compute loss values for optical flow photometric consistency and flow semantic consistency. The loss function unit 225 compares values for corresponding pixels in the disparity estimates for a sequence of image pairs and the corresponding pixels in the semantic segmentation estimates to compute loss values for disparity photometric consistency and disparity semantic consistency.

In a single pyramid level, photometric consistency is defined as $$\mathcal{L}_{PC} = \|I^l - g(I^r, D^l)\|_1 \odot \overline{O}_F + \|I_1 - g(I_2, F_1)\|_1 \odot \overline{O}_F, \quad \text{(Eq. 3)}$$

where $g(\cdot,\cdot)$ is the differentiable warping function, $\overline{O} = 1 - O$, and $\odot$ denotes element-wise multiplication followed by summation, and some superscripts are omitted when the context is clear. The photometric consistency loss term reasons about occlusion by modulating the consistency loss using the occlusion map and tightly couples occlusion with optical flow and disparity.

However, photometric consistency is fragile, subject to lighting changes. Therefore, semantic consistency that encourages two corresponding pixels to have similar semantic segmentation posterior probability may be considered. Specifically, semantic consistency is defined as $$\mathcal{L}_{SC} = \|\tilde{y}^l - g(\tilde{y}^r, D^l)\|_1 \odot \overline{O}_D + \|\tilde{y}_1 - g(\tilde{y}_2, F_1)\|_1 \odot \overline{O}_F, \quad \text{(Eq. 4)}$$

where ỹ denotes a posterior probability image. Unlike raw pixel values, the segmentation posterior probability is more robust to lighting changes. $\mathcal{L}_{PC}$ and $\mathcal{L}_{SC}$ are defined for both optical flow and disparity. Due to occlusion between two images, not every pixel can find its correspondence in the other one. Therefore, occlusion reasoning is also included in the loss functions.

Finally, a smoothness term is considered that encourages two adjacent pixels to have similar optical flow and disparity values. For disparity D, the smoothness term is defined as $$\mathcal{L}_{SM} = \Sigma_p (e^{-\|\partial_x I(p)\|} \partial_x D(p) + e^{-\|\partial_y I(p)\|} \partial_y D(p)). \quad \text{(Eq. 5)}$$

The smoothness term for the optical flow field is defined similarly.

When corresponding ground-truth annotations are available for training the scene flow estimation system 100 and/or 150, the combined supervised and self-supervised losses is defined as:

$$\mathcal{L}_{sp} = \mathcal{L}_F + \mathcal{L}_D + a_{PC}\mathcal{L}_{PC} + a_{SC}\mathcal{L}_{SC} + a_{SM}\mathcal{L}_{SM}. \quad \text{(Eq. 6)}$$

In an embodiment $a_{PC}=0.5$, $a_{SC}=0.5$, $a_{SM}=0.01$, $\times C_H \times C_w$, where $C_H$ and $C_w$ are crop height and width, respectively. In an embodiment, the loss function unit 225 computes the combined loss $\mathcal{L}_{sp}$.

Another self-supervised loss term that may be computed when a background portion of the images is static is disparity consistency. Given disparity predictions of two frames, estimations of disparity on the static background should align well by warping one image to the other image using camera pose estimation. The static background mask can be determined from the semantic segmentation result. For example, trees and buildings should be static while cars and pedestrians are potentially moving.

In an embodiment, the disparity estimates generated by the disparity decoder 115 and/or 165 include first disparity estimates for a first image in the sequence of image pairs and second disparity estimates for a second image in the sequence of image pairs, and the loss function unit 225 warps pixels in the first disparity estimates according to the camera pose estimates to produce warped first disparity estimates and then compares the warped first disparity estimates with the second disparity estimates to compute a disparity consistency loss value for sequences having static backgrounds.

Figure 2B:
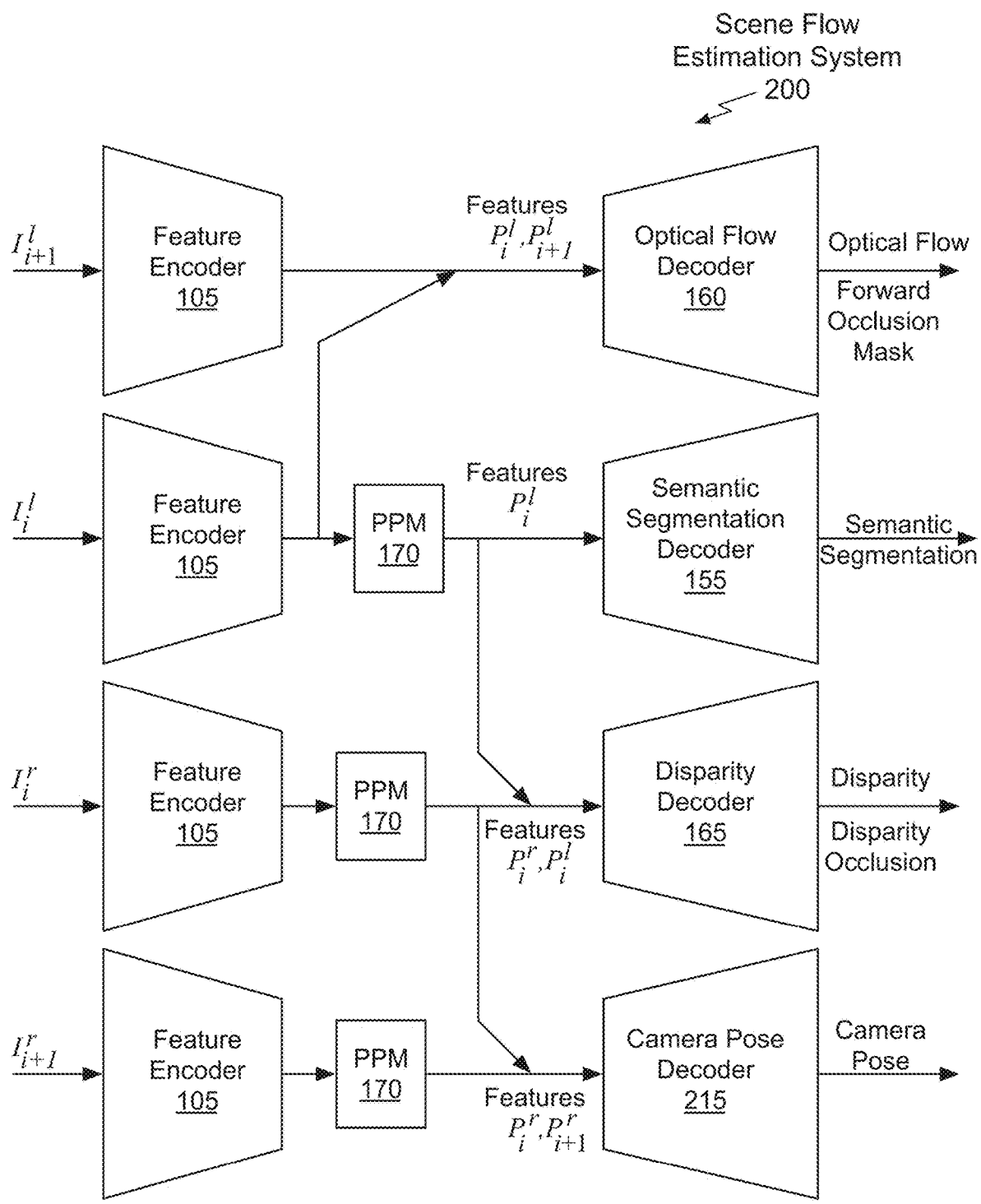
FIG. 2B illustrates a block diagram of another scene flow estimation system, in accordance with an embodiment.

FIG. 2B illustrates a block diagram of another scene flow estimation system 200, in accordance with an embodiment. The scene flow estimation system 200 includes the feature encoder(s) and the task-specific decoders of the scene flow estimation system 150 and also includes a camera pose decoder 215. The camera pose decoder 215 estimates the camera pose for each image based on the features of two images in the sequence of images, such as $P_i^r$ and $P_{i+1}^r$.

Finally, flow depth consistency may also be computed to provide another self-supervised loss term when a background portion of the images is static. Given two images, a first image can be mapped into 3D space using disparity estimation. For a particular pixel, the pixel is mapped into 3D space and is then projected into a 2D image plane of the second image using the camera pose estimation and camera intrinsic parameters to produce a first location. On the other hand, the same pixel can be mapped to the second image using optical flow estimation to produce a second location. The first and second locations should align, so a distance between the first and second locations may be used as a supervision signal.

In an embodiment, the disparity estimates generated by the disparity decoder 115 and/or 165 include first disparity estimates for a first image in the sequence of image pairs and second disparity estimates for a second image in the sequence of image pairs, and the loss function unit 225 maps pixels in the first image according to the first disparity estimates to produce 3D estimates, projects the 3D estimates into a 2D image plane according to the camera pose estimates to produce projected estimates for the second image, mapping pixels in the first image according to the optical flow estimates to produce flowed estimates for the second image, and then compares the projected estimates and the flowed estimates to compute a flow depth consistency loss value for sequences having static backgrounds.

The scene flow estimation system 100, 150, and 200 each provide a compact neural network model for holistic scene flow estimation, sharing features among several related tasks: optical flow, disparity, occlusion detection, and semantic segmentation. The scene flow estimation systems 100, 150, and/or 200 can execute fast, even in real-time. The scene flow estimation systems 100, 150, and/or 200 obtain results comparable to the state of the art on disparity and semantic segmentation, while consuming much less memory.

By sharing a single feature encoder 105 for different tasks, better feature representations can be learned during end-to-end (joint) training. Multi-task learning not only induces better feature representations but also allows extra supervision for training. Importantly, while the limited labeled training data may be used to train the scene flow estimation system 100, 150, or 200 in a supervised manner, unlabeled data may also be used to improve the accuracy through semi-supervised training. In an embodiment, joint training with semantic segmentation and/or occlusion improves the accuracy of optical flow and disparity estimations.

In an embodiment, a loss term includes self-supervised loss terms to handle partially labeled data. In an embodiment, the scene flow estimation system 100, 150, or 200 is fine-tuned using sparse optical flow and disparity annotations. For disparity training, disparity semantic consistency and disparity photometric consistency may be used in place of or in addition to ground-truth annotations. For optical flow training, flow semantic consistency and flow photometric consistency may be used in place of or in addition to ground-truth annotations. When camera pose estimation is performed by a decoder, the self-supervised loss may use depth flow consistency (for scenes with a static background). In an embodiment, a loss term includes supervised loss terms, self-supervised loss terms, and/or loss terms based on camera pose estimation.

Parallel Processing Architecture

Figure 3:
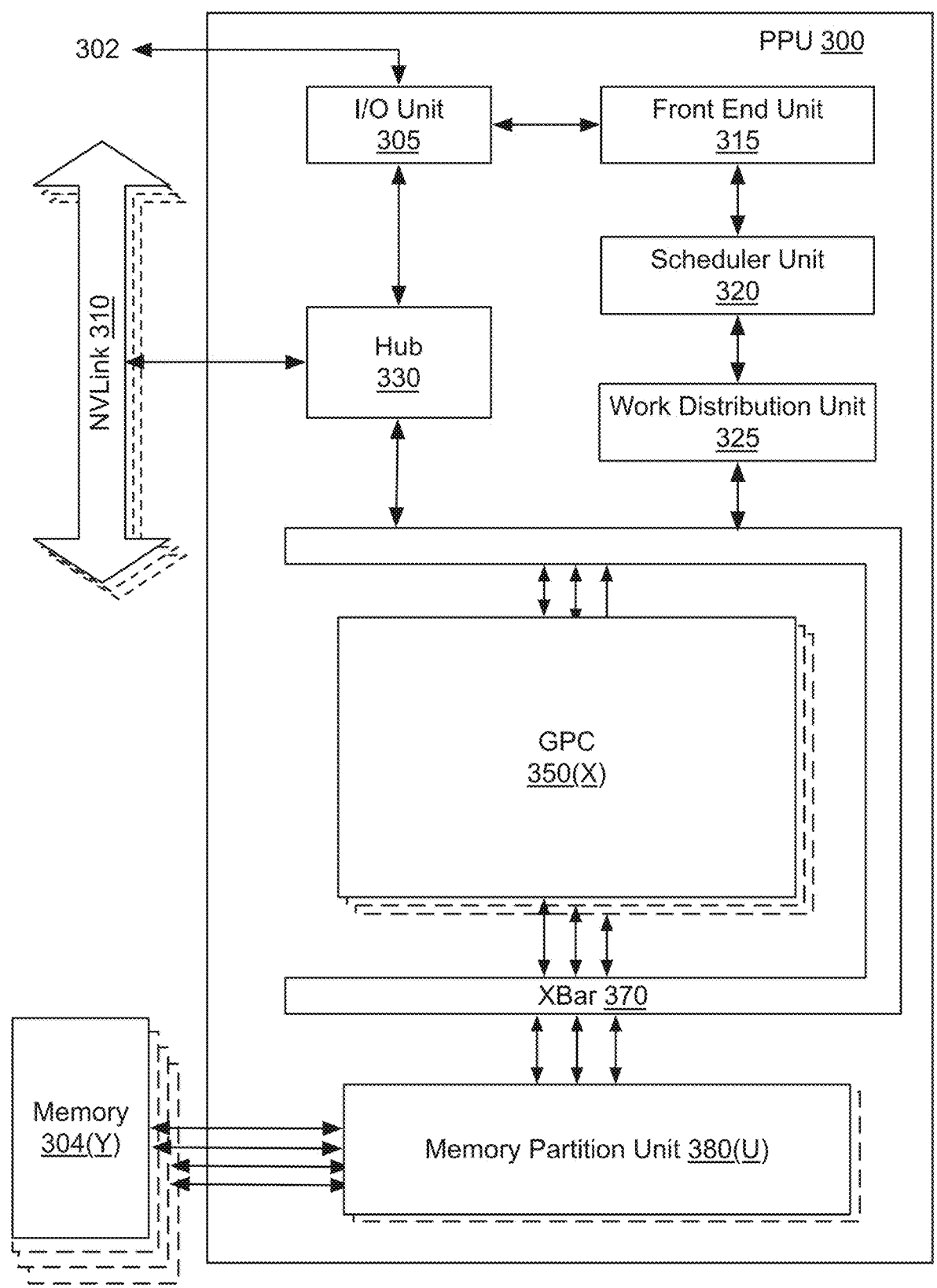
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
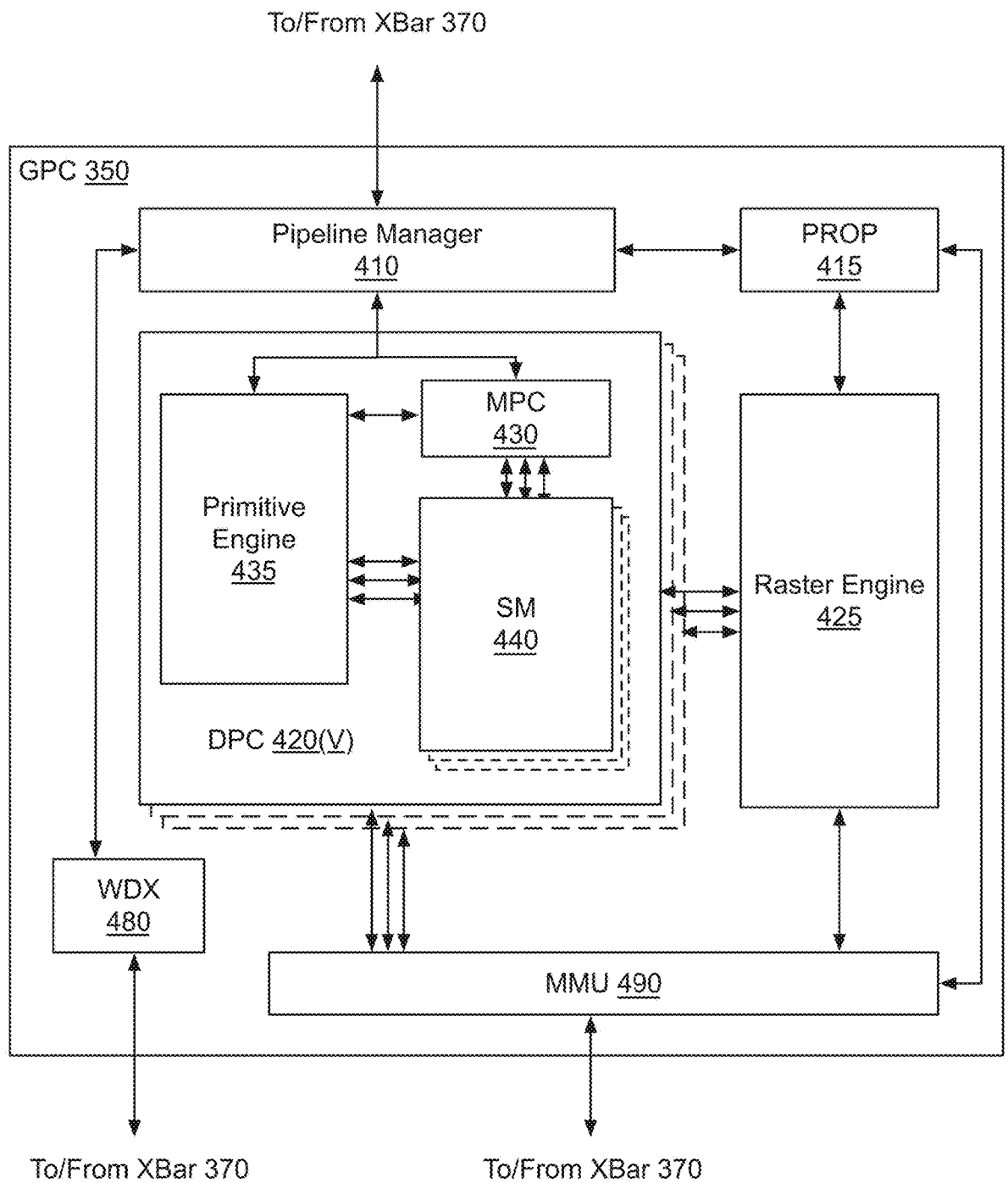
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
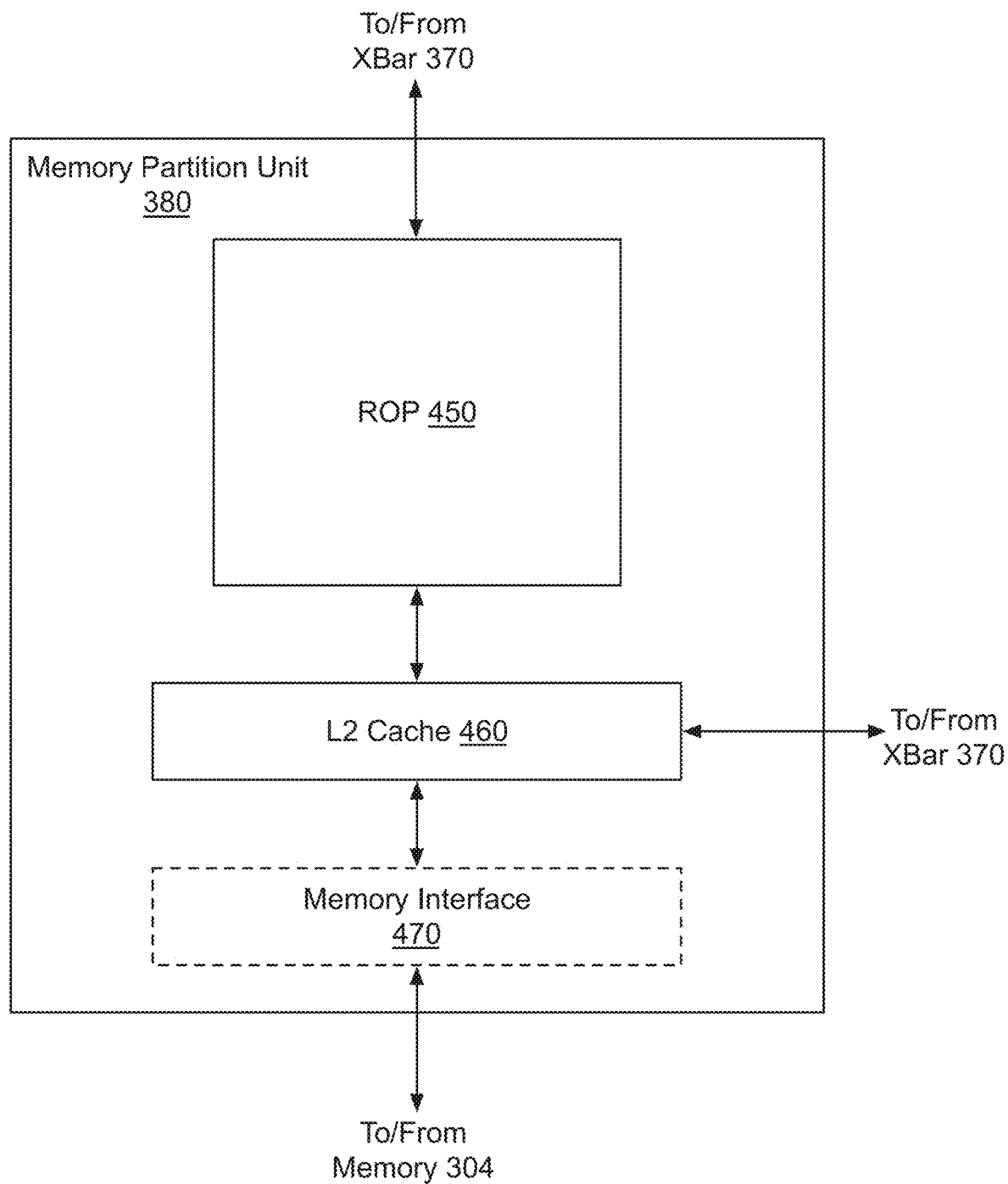
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
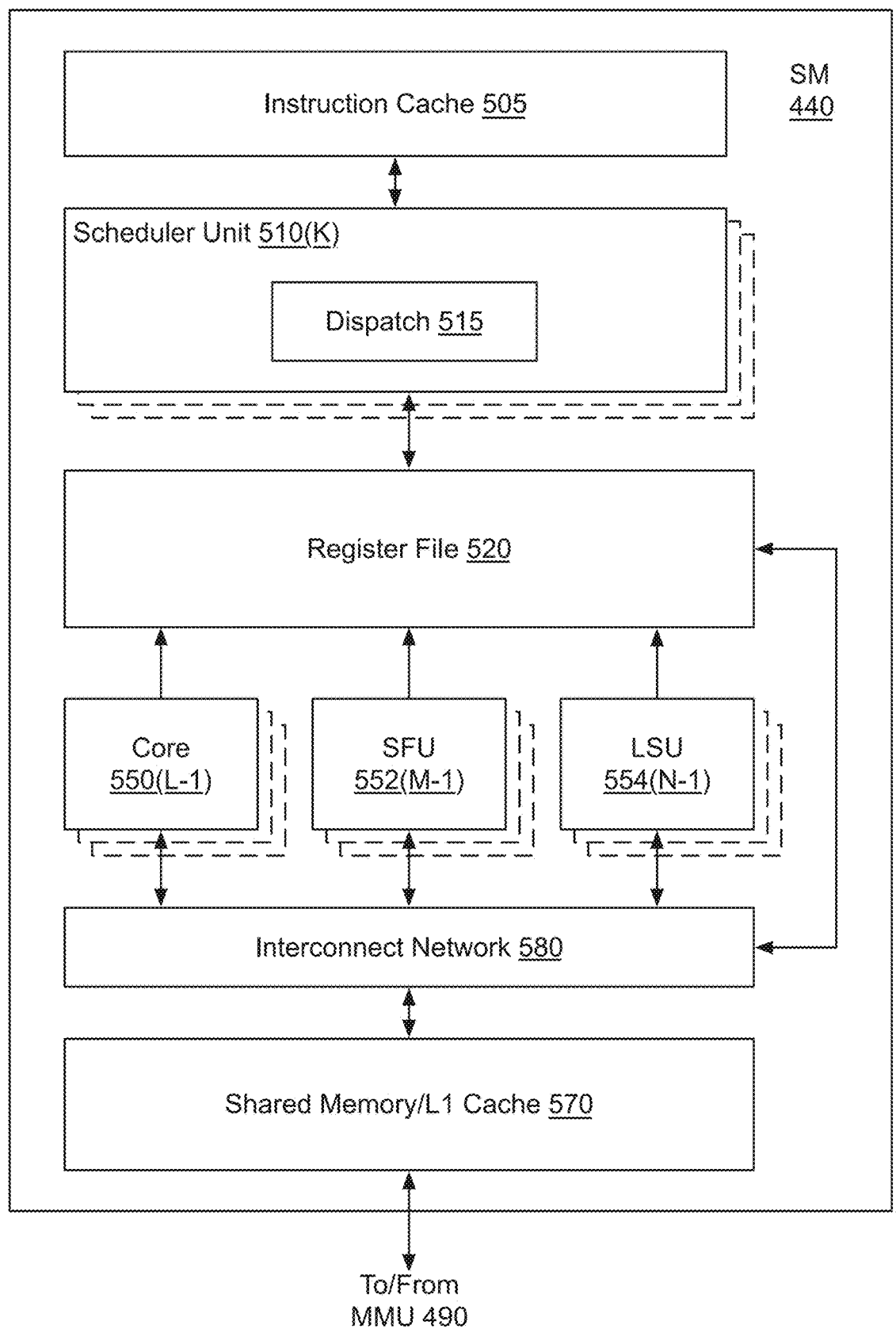
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC)

CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
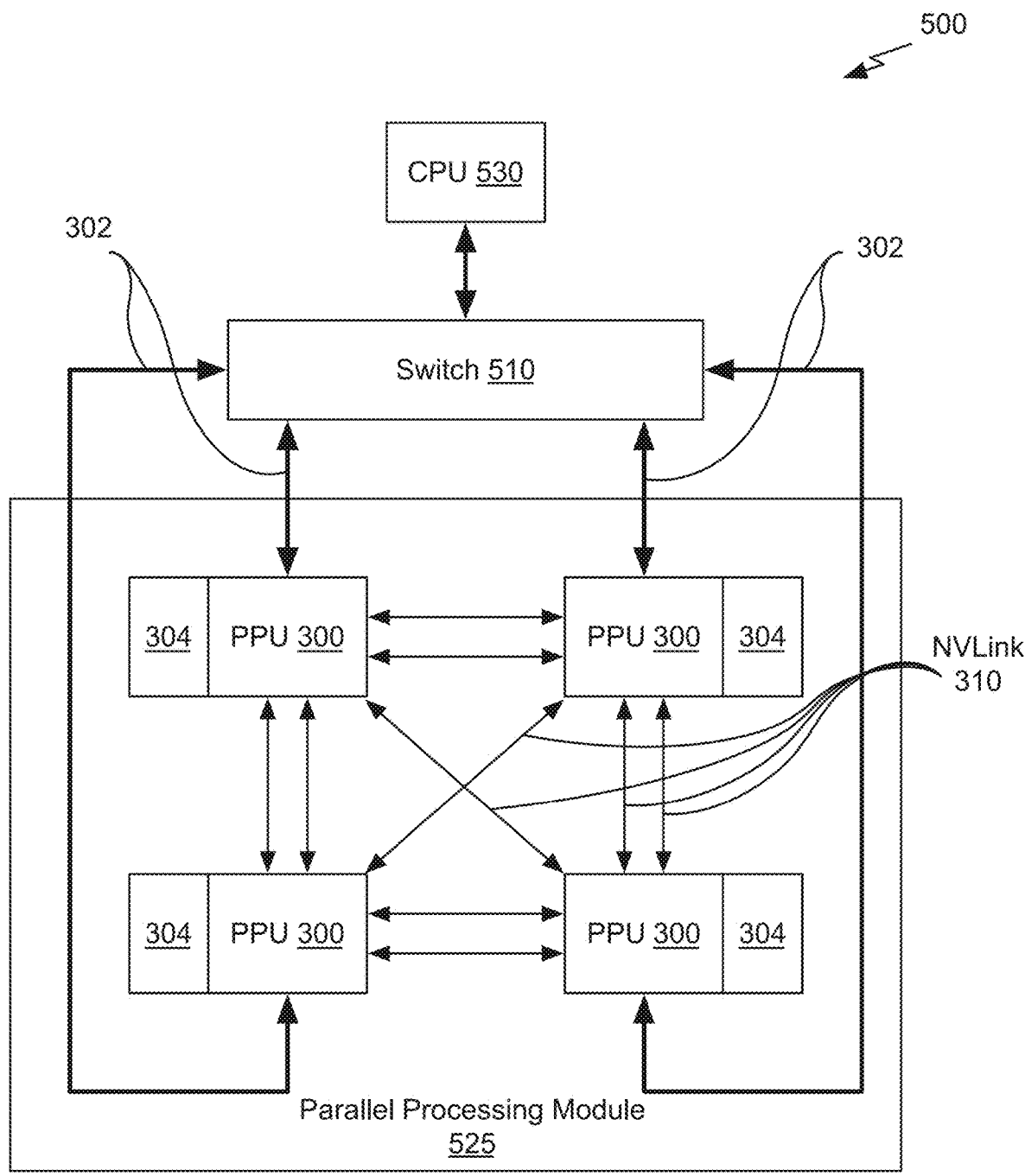
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 120 shown in FIG. 1B. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
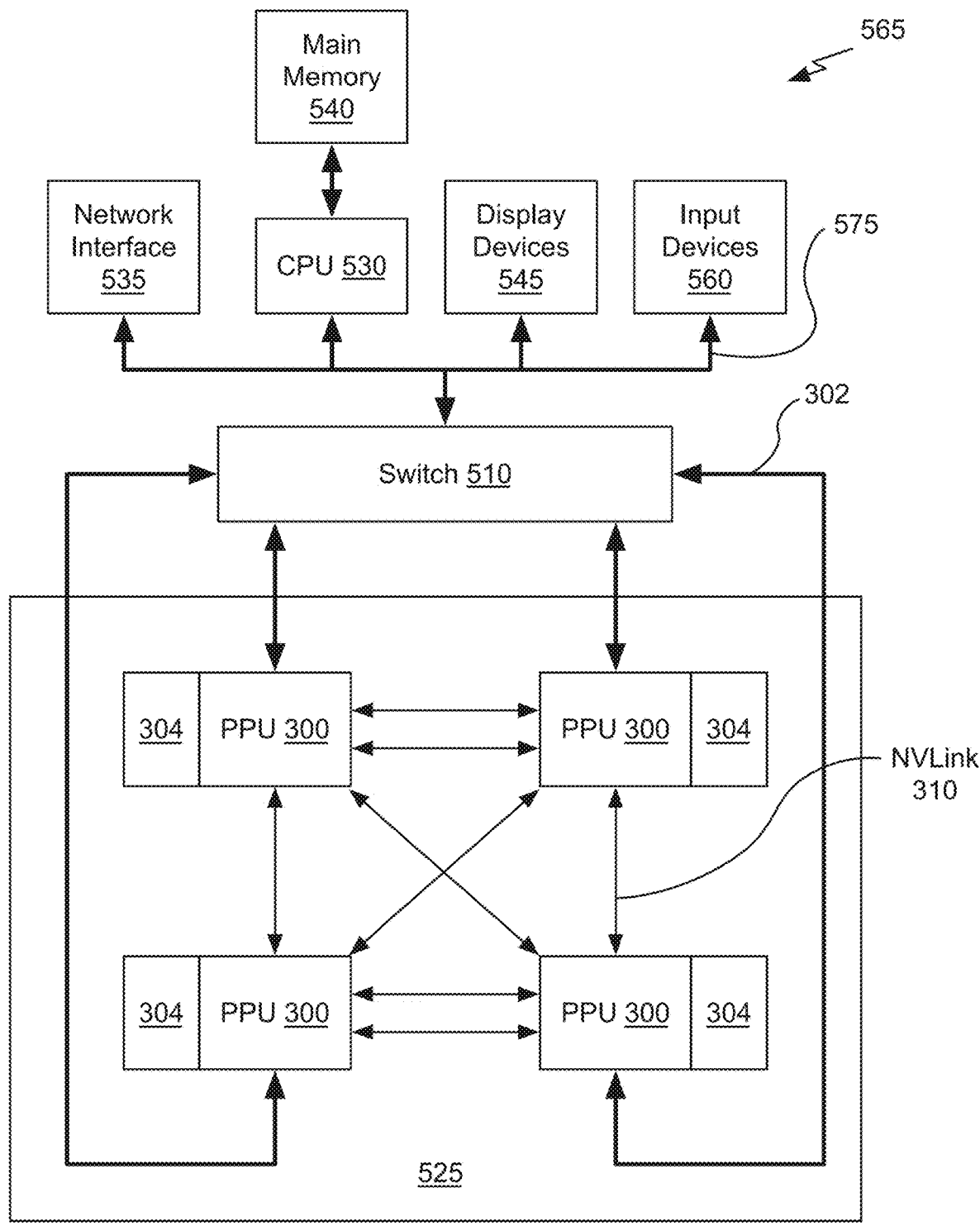
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 120 shown in FIG. 1B.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
    receiving a first set of features for a first stereo image pair in a sequence of image pairs;
    receiving a second set of features for a second stereo image pair in the sequence of image pairs;
    computing, by a first task-specific decoder neural network, disparity estimates for the sequence of image pairs based on the first set of features;
    computing, by a second task-specific decoder neural network, optical flow estimates for the sequence of image pairs based on a single view of the first set of features and the second set of features, wherein the single view is either left viewpoint images or right viewpoint images in the sequence of image pairs; and
    combining the disparity estimates and the optical flow estimates to produce a scene flow estimate for the sequence of image pairs.

2. The computer-implemented method of claim 1, further comprising generating the first set of features and the second set of features by an encoder neural network.

3. The computer-implemented method of claim 1, wherein the first set of features includes a feature pyramid of a first image of a scene captured from a first viewpoint and a feature pyramid of a second image of the scene captured from a second viewpoint.

4. The computer-implemented method of claim 3, wherein the second set of features includes a feature pyramid of a third image that is after the first image in the sequence and is captured from the first viewpoint.

5. The computer-implemented method of claim 1, wherein the first task-specific decoder neural network and the second task-specific decoder neural network use the same weight parameters to process the first set of features and the second set of features.

6. The computer-implemented method of claim 1, further comprising computing semantic segmentation estimates for the sequence of image pairs based on the first set of features and the second set of features by a third task-specific decoder neural network.

7. The computer-implemented method of claim 6, further comprising comparing values for corresponding pixels in the optical flow estimates for the sequence of image pairs and the corresponding pixels in the semantic segmentation estimates to compute a loss value.

8. The computer-implemented method of claim 6, further comprising comparing values for corresponding pixels in the disparity estimates for the sequence of image pairs and the corresponding pixels in the semantic segmentation estimates to compute a loss value.

9. The computer-implemented method of claim 1, further comprising computing camera pose estimates for the sequence of image pairs based on the first set of features and the second set of features by a third task-specific decoder neural network.

10. The computer-implemented method of claim 9, wherein the disparity estimates include first disparity estimates for a first image in the sequence of image pairs and second disparity estimates for a second image in the sequence of image pairs, and further comprising:
    warping pixels in the first disparity estimates according to the camera pose estimates to produce warped first disparity estimates; and
    comparing the warped first disparity estimates with the second disparity estimates to compute a loss value.

11. The computer-implemented method of claim 9, wherein the disparity estimates include first disparity estimates for a first image in the sequence of image pairs and second disparity estimates for a second image in the sequence of image pairs, and further comprising:
    mapping pixels in the first image according to the first disparity estimates to produce 3D estimates;
    projecting the 3D estimates into a 2D image plane according to the camera pose estimates to produce projected estimates for the second image;
    mapping pixels in the first image according to the optical flow estimates to produce flowed estimates for the second image; and
    comparing the projected estimates and the flowed estimates to compute a loss value.

12. A scene flow estimation system, comprising:
    a feature encoder neural network configured to:
        generate a first set of features for a first stereo image pair in a sequence of image pairs; and
        generate a second set of features for a second stereo image pair in the sequence of image pairs;
    a first task-specific decoder neural network configured to compute disparity estimates for the sequence of image pairs based on the first set of features; and a second task-specific decoder neural network configured to compute optical flow estimates for the sequence of image pairs based on a single view of the first set of features and the second set of features, wherein the single view is either left viewpoint images or right viewpoint images in the sequence of image pairs and the disparity estimates and the optical flow estimates are combined to produce a scene flow estimate for the sequence of image pairs.

13. The system of claim 12, wherein the first set of features includes a feature pyramid of a first image of a scene captured from a first viewpoint and a feature pyramid of a second image of the scene captured from a second viewpoint.

14. The system of claim 13, wherein the second set of features includes a feature pyramid of a third image that is after the first image in the sequence and is captured from the first viewpoint.

15. The system of claim 12, wherein the first task-specific decoder neural network and the second task-specific decoder neural network use the same parameters to process the first set of features and the second set of features parameters.

16. The system of claim 12, further comprising a third task-specific decoder neural network configured to compute semantic segmentation estimates for the sequence of image pairs based on the first set of features and the second set of features.

17. The system of claim 16, further comprising a loss function unit configured to compare values for corresponding pixels in the optical flow estimates for the sequence of image pairs and the corresponding pixels in the semantic segmentation estimates to compute a loss value.

18. The system of claim 16, further comprising a loss function unit configured to compare values for corresponding pixels in the disparity estimates for the sequence of image pairs and the corresponding pixels in the semantic segmentation estimates to compute a loss value.

19. The system of claim 12, further comprising a third task-specific decoder neural network configured to compute camera pose estimates for the sequence of image pairs based on the first set of features and the second set of features.

20. A non-transitory computer-readable media storing computer instructions for scene flow estimation that, when executed by one or more processors, cause the one or more processors to perform the steps of:
receiving a first set of features for a first stereo image pair in a sequence of image pairs;
receiving a second set of features for a second stereo image pair in the sequence of image pairs;
computing, by a first task-specific decoder neural network, disparity estimates for the sequence of image pairs based on the first set of features;
computing, by a second task-specific decoder neural network, optical flow estimates for the sequence of image pairs based on a single view of the first set of features and the second set of features, wherein the single view is either left viewpoint images or right viewpoint images in the sequence of image pairs; and
combining the disparity estimates and the optical flow estimates to produce a scene flow estimate for the sequence of image pairs.

* * * * *